Sept. 25, 1962 G. B. BAILEY ETAL 3,055,347
METHOD AND APPARATUS FOR HEATING ORGANIC LIQUIDS
Filed March 27, 1957 2 Sheets-Sheet 1

INVENTORS
GEORGE B. BAILEY
GEORGE M. RAPP
BY
Brumbaugh, Free, Graves & Donohue
THEIR ATTORNEYS Sept. 25, 1962 G. B. BAILEY ETAL 3,055,347
METHOD AND APPARATUS FOR HEATING ORGANIC LIQUIDS
Filed March 27, 1957 2 Sheets-Sheet 2
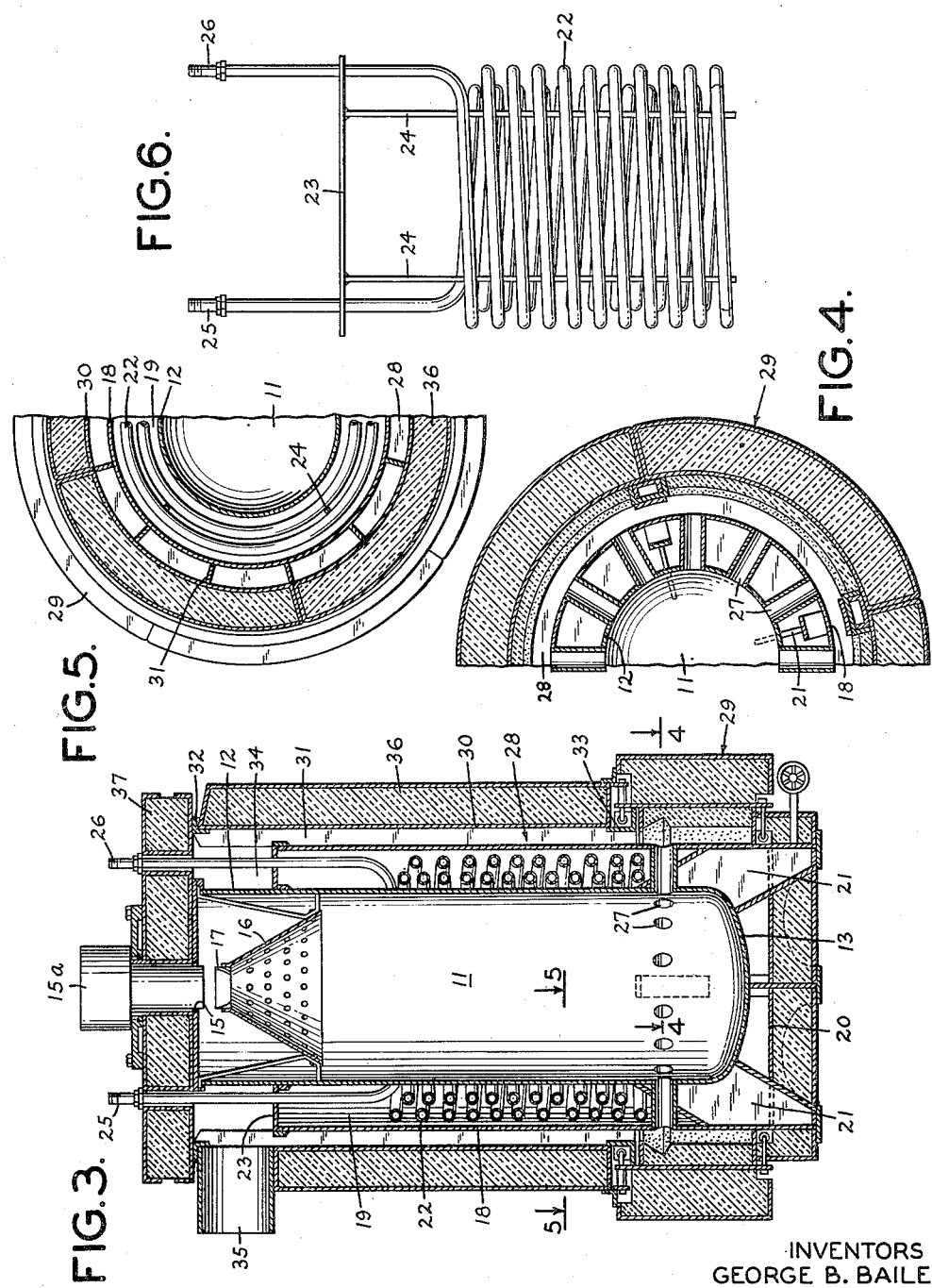
INVENTORS
GEORGE B. BAILEY
GEORGE M. RAPP
BY
Brumbaugh, Free, Graves & Donohue
THEIR ATTORNEYS

United States Patent Office 3,055,347
Patented Sept. 25, 1962

---

3,055,347
METHOD AND APPARATUS FOR HEATING ORGANIC LIQUIDS
George B. Bailey, Orange, and George M. Rapp, Hamden, Conn., assignors to John B. Pierce Foundation, New Haven, Conn., a corporation of New York
Filed Mar. 27, 1957, Ser. No. 648,882
1 Claim. (Cl. 122—33)

This invention relates to heaters and heat exchangers and, more particularly, to a method and apparatus for heating an organic liquid to a temperature close to its initial boiling point without substantial decomposition.

In the process of heating organic and metal-organic liquids to temperatures below but close to their intitial boiling points, thermal decomposition of the liquids may occur in the form of polymerization, oxidation or thermal cracking. For example, with conventional methods of heating, relatively rapid decomposition often takes place when the liquid is heated to a mean bulk temperature 100° F. or more below the initial boiling point of the liquid. It is known to the art that the rate of decomposition under these conditions can be substantially reduced and the maximum bulk liquid operating temperature increased by limiting the temperature difference between the heating surface and the adjacent liquid to small values. For organo-silicon liquids, for example, we have found a value of 25° F. or less desirable. This temperature difference, known as the "film-temperature difference" is often as high as 100°–200° F. in some types of conventional direct-fired organic liquid heaters. This results from the inevitable non-uniform and high local heat flux rates on the sides of tube surfaces exposed to the direct-applied heating medium, i.e., hot flames and combustion gases. Thus, the liquid is overheated or "burned" locally over a portion of its peripheral flow area, which in turn greatly accelerates its rate of thermal decomposition. Further, it is apparent that as a result of this non-uniform heating, "burning" of the organic liquid may occur even though the average film-temperature difference is below the desired maximum value of about 25° F.

The aforementioned non-uniform and inordinately high local difference between the temperature of the inside wall wetted by the heated liquid and the mean or bulk temperature of the heated liquid itself (i.e., film-temperature differences) can be reduced by lowering the temperature of this wetted wall by interposing an additional uniform thermal resistance and radiation shield between the heat source and the wall itself. Since the film-temperature difference is the driving force for heat transfer, this reduction in its value may be compensated for (in maintaining equal heat flux) by an increase in area of the liquid-wetted heating surface, and by an increase in the liquid flow velocity (within the practical limits of pressure drop). Additionally, this increase in the heating surface taken in conjunction with the reduction in film-temperature differences, contrary to what might be expected, contributes to rather than detracts from compactness and economy of overall heater design because the reduced film-temperature difference itself permits the use of substantially smaller "mean beam length" in the radiant section of the heater.

Accordingly, it is an object of this invention to provide a method and apparatus for heating organic and metal organic liquids to bulk temperatures within about 50° F. of their initial boiling points without substantial decomposition.

Another object of the invention is to provide a method and apparatus for heating organic and metal-organic liquids while maintaining a film-temperature difference of not more than 25° F.

A further object of the invention is to provide a method and apparatus for the direct-fired heating of organic and metal-organic liquids that prevents local overheating by insuring a uniform heat flux input rate to the heated fluid, independently of the shortcomings of conventional heater design, and simultaneously to provide more accurate temperature control and reduction in temperature fluctuations resulting from changes in loading and firing rates.

Still another object of this invention is to provide apparatus of the above character which utilizes a large heating surface area and a low film-temperature difference in a compact and highly efficient arrangement, and which is inexpensive in manufacture, installation and maintenance.

These and other objects of the invention are attained by heating a first surface in direct communication with the source of heat and transferring heat therefrom to the liquid-heating surface through an intermediate layer of heat-stable liquid having a high boiling point and heat conduction characteristics substantially equal to those of water. The intermediate or "coupling" liquid may be contained in an annular chamber having as its inner wall the direct-heated surface of a combustion chamber. A burner directs hot gases into the combustion chamber from one end and exhaust gases from the other end of the chamber are carried by an exhaust passage along the outer wall of the liquid annulus, supplying additional heat to the coupling liquid by convection. Circulating means enclosed by a second surface within the annular chamber and spaced from the inner wall carries the organic liquid.

Further objects and advantages of the invention will be readily apparent to those skilled in the art from a reading of the following description in conjunction with the accompanying drawings in which:

FIG. 3 is an elevation view in cross section taken through the center of a typical heater constructed according to the invention;

FIG. 4 is a partial sectional view taken on the plane designated by the lines 4—4 of FIG. 3 and looking in the direction of the arrows;

FIG. 5 is a partial sectional view taken on a plane designated by the lines 5—5 of FIG. 3 and looking in the direction of the arrows; and FIG. 6 is a view in elevation of a helical coil adapted for use in the heater shown in FIG. 3.

Figure 1:
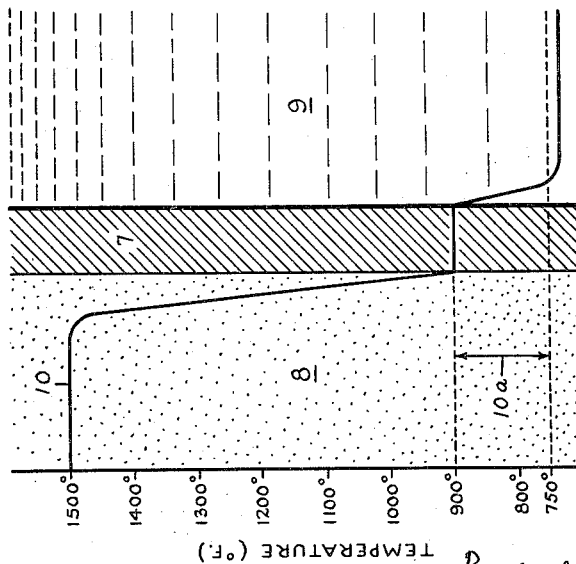
FIG. 1 is a graphical representation illustrating typical temperature conditions obtained with conventional heating.

As shown in FIG. 1, a conventional direct-fired heater wherein a single wall 7 separates a source of heat 8 from a circulated organic or metal-organic liquid 9 which is to be heated may have a temperature gradient characteristic represented by the graph 10. In the illustrated example, the burning gas temperature is shown as being 1500° F. but this is highly variable and may range between 1100° and 1700° F. Inasmuch as the temperature gradient within the metal wall 7 is small with respect to that in the burning gas 8 and the liquid 9, it may be considered to be zero and therefore is illustrated as a horizontal line.

Assuming the organic liquid 9 has an initial boiling point at 800° F. and is to be heated to a bulk temperature of 750° F., it will be observed that the temperature gradient conditions in the conventional heater are such that the adjacent surface of the wall 7 is maintained at about 900° F. to obtain the desired result. This necessarily produces a film-temperature difference 10a of at least 150° F., resulting in the above-mentioned decomposition of the organic liquid.

Figure 2:
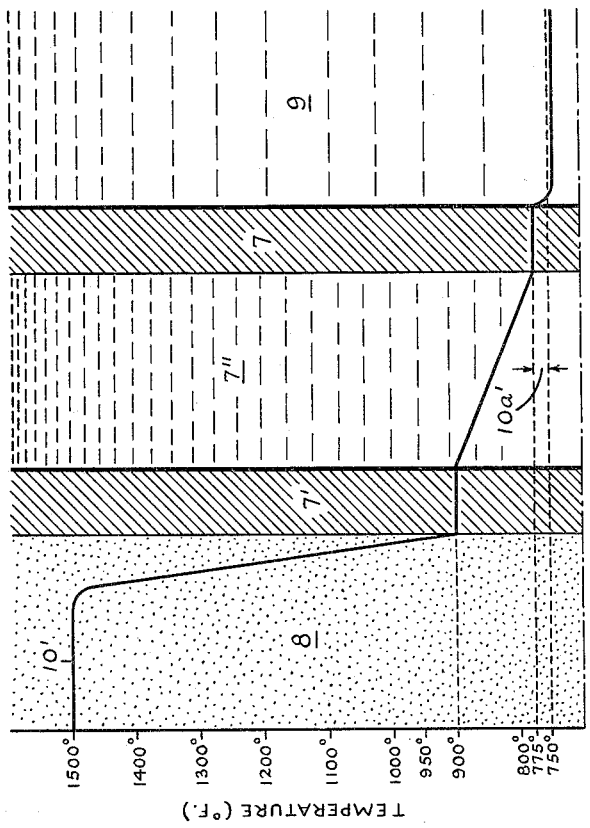
FIG. 2 is a graphical representation illustrating typical temperature conditions obtained by the use of the method and apparatus of the invention.

If, however, as illustrated in FIG. 2, a first wall 7', spaced from the wall 7, is directly heated by the hot gases 8 and heat is transferred from that wall to the wall 7 through an intermediate coupling liquid 7'', substantially improved temperature gradient conditions as represented, for example, by the line 10' may be obtained. It will be noted that with this arrangement the organic liquid 9 may be heated to a bulk temperature of 750° F. while the adjacent surface of the wall 7 is maintained at or below 775° F., thus resulting in a maximum film-temperature difference 10a' of 25° F.

The coupling liquid 7'' is preferably a high boiling point, highly heat-stable, non-corrosive incombustible fluid which has natural convection heat conduction properties equal to or superior to those of water. Inasmuch as no forced circulation is necessary, the coupling liquid may be one which is solid at room temperature. For example, a eutectic mixture of inorganic nitrate salts such as Dupont's mixture known by the registered trade name "Hitec," which is composed of 40% sodium nitrite, 7% sodium nitrate and 53% potassium nitrate by weight, has been utilized successfully. Other suitable coupling liquids are eutectic mixtures of sodium, potassium and lithium chlorides, phenyl benzenes such as para-, meta-, and/or ortho-diphenyl benzenes and homologues thereof, and molten metals.

Referring to FIGS. 3, 4 and 5, the apparatus for carrying out the above heating method according to the invention comprises a combustion chamber 11 enclosed by a vertical cylindrical pipe 12 and sealed at its lower end by a flanged and dished head 13, an apertured flat cover plate 14 being removably secured at the top of the chamber. The heater may be fired by a high pressure forced-draft down-blast oil burner 15a inserted in a central aperture 15 in the cover plate 14 and supported by the top section 37. Mounted in the top part of the combustion chamber is a diffuser cone 16 equipped with deflecting vanes 17 to promote turbulence in the fuel-air mixture and insure efficient combustion. In addition, the cone 16 shields the non-liquid cooled metal at the top of the chamber from direct radiant heat exchange with the hot gases below to prevent overheating of the upper portion of the pipe 12.

A second concentric pipe 18 surrounds the pipe 12 forming an annular space 19 therebetween, the bottom of the pipe 18 being sealed by a flat plate 20 beneath the head 13. Four radial bracket members 21 support the combustion chamber in an elevated position within the pipe 18 and the base of the second pipe provides support for the entire heater.

The annular space 19 is filled with the coupling liquid described above and a one-piece double helical coil 22 designed to present a large surface area to the coupling liquid is suspended within the annulus. As best seen in FIG. 4, an annular disc 23, which acts as the cover for the annular space 19, supports the coil 22, four vertical spacer rods 24 being mounted within the coil to space the coil turns. In order to provide an inlet and outlet to the coil for the organic liquid to be heated, the ends 25 and 26 of the coil project upwardly through the disc 23 to the top of the heater. It will be noted that the free suspension of the coil 22 within the annulus 19 in this manner protects the coil against disruptive strains which would otherwise be introduced between the pipes 12 and 18 and the coil by differential thermal expansion at the high operating temperatures of the unit. Another unique feature of the heater structure is the clear depth of the annulus 19 from the bracket members 21 to the top of the pipe 18, permitting the free suspension of the coil 22 and allowing facile removal and replacement of the unitary structure comprising the coil 22, the disc 23 and the spacer rods 24.

Near the bottom of the annulus 19, a series of angularly spaced fire tubes 27 extend radially from the combustion chamber 11 to an annular gas passage 28 surrounded at the lower end by four segmental refractor lined fire doors 29 and above by a concentric metal cylinder 30. In order to more effectively conduct heat from the exhaust gases to the annulus 19, a series of vertical radial fins 31, dividing the gas passage 28 into angular sections, are welded to the outside of the pipe 18. These fins support a pair of girth rings 32 and 33 upon which the cylinder 30 is mounted. A circular chamber 34, surrounding the pipe 12 above the liquid annulus 19, connects the gas passage 28 with an exhaust vent 35.

The heater is enclosed by sections of metal-jacketed high temperature insulation 36, the top section 37 being a removable cover with a central aperture to receive the oil burner 15a. The fire doors 29, which can be opened to provide access to the fire tubes 27, are similarly insulated and may include conventional sight tubes for flame inspection and pipe sleeves for thermocouple gas temperature measurements (not shown.)

In operation, the burning fuel-air mixture from the burner is forced downwardly inside the cone 16 heating the entire surface of the pipe 12 adjacent the liquid in the annular space 19. Hot exhaust gases from the chamber pass outwardly through the fire tubes 27 and are deflected by the refractory lining of the fire doors 29 against the pipe 18 which forms the outer lining of the liquid annulus 19. In passing upwardly through the gas passage 28 to the exhaust vent 35, these gases transfer heat to the liquid annulus 19 through the pipe 18 and the vertical fins 31. In addition, the exhaust gases preheat the air-fuel mixture in the combustion chamber above the diffuser cone 16 while passing around the pipe 12 to the exhaust vent 35. By surrounding the coupling liquid with hot gases and preheating the fuel mixture in this manner, it is apparent that the novel heater of the invention obtains the maximum heating effect from the combustion of the air-fuel mixture.

Inasmuch as the coil 22 is spaced from the direct-heated wall 12 of the combustion chamber by a coupling liquid according to the method described above, the film-temperature difference between the inner coil surface and a liquid circulating through the coil may be readily maintained at or below the desired value of about 25° F. and local overheating or "burning" of the liquid thus prevented. In addition, the construction of the heater in the manner described above assures more accurate temperature control and decreased fluctuations in the temperature of the organic or metal-organic liquid due to changes in loading or firing rates.

The extreme compactness and high efficiency of the novel heater described above are exemplified by the performance of a typical unit contained within a diameter of 3 feet 6 inches and a height of 6 feet 10 inches. In this heater, which supplies 160,000 B.t.u. to the liquid circulated through the helical coil with a maximum film-temperature difference of 25° F., an 18-inch combustion chamber is surrounded by a 26-inch liquid annulus and a 29-inch gas passage.

Although the invention has been described above with reference to a specific arrangement, many variations and modifications in the method and structure will occur to those skilled in the art. Accordingly, it is intended that all such variations and modifications be included within the scope of the following claim.

We claim:

A heater comprising a vertical cylindrical combustion chamber sealed at its lower end, a second cylinder concentric with the combustion chamber defining a second chamber surrounding the combustion chamber and closed at its lower end beneath the combustion chamber, a plurality of bracket members supporting the combustion chamber at its lower end and connected to the second cylinder, said second chamber containing a stationary heat transfer liquid, a helical tubular member pendantly supported within the second chamber, an apertured cover at the top of the combustion chamber, a burner mounted on the cover to direct fuel downwardly into the chamber, a deflection cone mounted near the top of the chamber to impart a swirling motion and turbulence to the fuel-air mixture, a third cylinder surrounding the second cylinder and forming an annular gas passage therewith, a plurality of passageways through the second chamber connecting the lower portion of the combustion chamber with the gas passage, the lower portion of said third cylinder being removably mounted to provide access to the passageways and being lined with heat-resistant material, a plurality of vertical fin members within the gas passage connected to the second cylinder, an exhaust vent, and an annular chamber above the second chamber communicating with the gas passage and with the exhaust vent.

References Cited in the file of this patent

UNITED STATES PATENTS

| | | |
|---|---|---|
| 399,259 | Gilstrap | Mar. 12, 1889 |
| 762,541 | Long | June 14, 1904 |
| 1,790,555 | Plumb | Jan. 27, 1931 |
| 1,814,605 | Mayr | July 14, 1931 |
| 1,980,424 | Morgan | Nov. 13, 1934 |
| 2,222,202 | Levine | Nov. 19, 1940 |
| 2,383,924 | Way et al. | Aug. 28, 1945 |
| 2,656,821 | Ray | Oct. 27, 1953 |
| 2,753,851 | Lemos et al. | July 10, 1956 |
| 2,768,497 | Hayes | Oct. 30, 1956 |
| 2,791,204 | Andrus | May 7, 1957 |
| 2,878,644 | Fenn | Mar. 24, 1959 |

FOREIGN PATENTS

| | | |
|---|---|---|
| 419,750 | Great Britain | Nov. 19, 1934 |